(12) United States Patent
Kvarnstrand (10) Patent No.: US 11,034,048 B2
(45) Date of Patent: Jun. 15, 2021

(54) WOOD CUTTING TOOL AND AN ARRANGEMENT FOR USING SAID TOOL

(71) Applicant: KVARNSTRANDS VERKTYG AB, Ekenässjön (SE)

(72) Inventor: Conny Kvarnstrand, Björköby (SE)

(73) Assignee: KVARNSTRANDS VERKTYG AB, Ekenässjön (SE)

( * ) Notice: Subject to any disclaimer, the term of this patent is extended or adjusted under 35 U.S.C. 154(b) by 122 days.

(21) Appl. No.: 16/310,083

(22) PCT Filed: Jun. 1, 2017

(86) PCT No.: PCT/SE2017/050584
§ 371 (c)(1),
(2) Date: Dec. 14, 2018

(87) PCT Pub. No.: WO2017/217907
PCT Pub. Date: Dec. 21, 2017

(65) Prior Publication Data
US 2019/0255728 A1  Aug. 22, 2019

(30) Foreign Application Priority Data
Jun. 15, 2016 (SE) .................................. 1650848-3

(51) Int. Cl.
*B27G 13/12* (2006.01)
*B23C 5/08* (2006.01)
(Continued)

(52) U.S. Cl.
CPC ................ *B27G 13/12* (2013.01); *B23C 5/08* (2013.01); *B23C 5/22* (2013.01); *B27B 5/02* (2013.01);
(Continued)

(58) Field of Classification Search
CPC ........ B27G 13/00; B27G 13/08; B27G 13/10; B27G 13/12; A01G 23/06; A01G 23/067;
(Continued)

(56) References Cited

U.S. PATENT DOCUMENTS 1,472,960 A * 11/1923 Conklin ................ B23C 5/2265
407/29
3,880,215 A   4/1975 Mallery
(Continued)

FOREIGN PATENT DOCUMENTS

AT   378146      6/1958
CH   568829 A5   11/1975
(Continued)

OTHER PUBLICATIONS

International Search Report, PCT/SE2017/050584, dated Aug. 28, 2017.
(Continued)

*Primary Examiner* — Matthew Katcoff
(74) *Attorney, Agent, or Firm* — Nixon & Vanderhye (57) ABSTRACT

Disclosed is a cutting tool mounted on a shaft rotating about an axis, including a body having first cutting inserts mounted with equal spacing at the outer periphery of the body, which first cutting inserts have a cutting edge extending across the width of the body at a predetermined peripheral radius from the axis; and second cutting inserts mounted with equal spacing adjacent the outer periphery on a first side surface of the body, which second cutting inserts have a cutting edge extending in an axial plane perpendicular to the axis. The cutting edge of each first insert extends up to a predetermined distance from the axial plane of the second inserts; and the cutting edge of each second insert preceding a first insert extends a predetermined radial distance outside the
(Continued)

peripheral radius of the cutting edges of the first inserts. Also disclosed is a related apparatus.

20 Claims, 11 Drawing Sheets

(51) Int. Cl.
| | |
|---|---|
| *B23C 5/22* | (2006.01) |
| *B27G 13/00* | (2006.01) |
| *B27B 33/20* | (2006.01) |
| *B27B 5/02* | (2006.01) |
| *B27B 33/12* | (2006.01) |
| *B27B 33/08* | (2006.01) |
| *B27L 11/00* | (2006.01) |

(52) U.S. Cl.
CPC .............. *B27B 33/08* (2013.01); *B27B 33/12* (2013.01); *B27B 33/20* (2013.01); *B27G 13/005* (2013.01); *B27L 11/007* (2013.01)

(58) Field of Classification Search
CPC ........... B27C 5/00; B02C 18/06; B02C 18/18; B02C 18/182; B02C 18/184; B23D 61/02; B23D 61/025; B23C 5/08; B23C 5/202; B23C 5/207; B23C 5/2295; B23C 2200/367; Y10T 407/1942; Y10T 407/191; Y10T 407/23
USPC ............................. 83/835, 837; 30/388–391
See application file for complete search history.

(56) References Cited

U.S. PATENT DOCUMENTS

| | | | | |
|---|---|---|---|---|
| 4,269,244 | A | | 5/1981 | Kinsella |
| 5,400,842 | A | * | 3/1995 | Brisson ................... B27B 1/007 144/2.1 |
| 5,617,908 | A | * | 4/1997 | Toogood ................ B27G 13/12 144/218 |
| 5,709,255 | A | | 1/1998 | Toogood |
| 7,216,682 | B1 | * | 5/2007 | Bennington ......... A01G 23/067 144/228 |
| 7,743,803 | B2 | * | 6/2010 | Paumier ............... A01G 23/067 144/235 |

FOREIGN PATENT DOCUMENTS

| | | |
|---|---|---|
| DE | 824257 C | 12/1951 |
| DE | 2166292 | 11/1973 |
| DE | 3022937 | 11/1981 |
| DE | 4341678 A1 | 8/1994 |
| EP | 1192027 | 4/2002 |
| WO | 94/01258 A1 | 1/1994 |

OTHER PUBLICATIONS

Written Opinion, PCT/SE2017/050584, dated Aug. 28, 2017.
Extended European Search Report issued in European Patent Application No. 17813686.7 dated Jan. 7, 2020.

* cited by examiner

WOOD CUTTING TOOL AND AN ARRANGEMENT FOR USING SAID TOOL

TECHNICAL FIELD

The invention relates to a cutting tool and an apparatus for using the cutting tool for longitudinal profiling a timber product, in particular for profiling a log prior to subdividing the log into board or similar products.

BACKGROUND OF THE INVENTION

It is generally known to provide wood cutting tools with indexable inserts in order to achieve advantages in high velocity cutting tools, including improved cutting properties and reduced maintenance costs. A problem is that the inserts are required to withstand the extreme abuse and shock to which they are subjected in certain industrial applications, such as timber processing, to a degree that is economically desirable. In many applications the cutting insert deterioration is rapid and a high tool failure rate requires frequent replacement not only of the indexable insert but often also of the entire tool.

In recent years it has become increasingly important to improve profitability during the machining of logs and to gain additional value by the recovery of wood chips that are formed in the process. Chip quality, consistency of size within certain parameters, is determined by rate of feed, comparative freedom from cutter clamp and holder interference during cutting and the cutting geometry employed. The chip value is usually dependent on maintaining a desired size and shape of the chips produced.

In view of the above, there is a need for further improvements in the field of wood cutting tools for the purpose of lowering the rate of tool deterioration and to facilitate the necessary replacement of cutting inserts in a cutting tool. Additionally, there is a need for further improvements in order to achieve smoother cutting, more accurately cut surfaces, and consistency in size and shape of chips produced.

The object of the invention is to provide an improved cutting tool that solves the above problems.

INVENTION

The above problems have been solved by a cutting tool and an apparatus using such a tool as claimed in the appended claims.

In the subsequent text, the term "axial plane" is intended to describe a plane at right angles to the axis of rotation of the cutting tool. Similarly, the term "radial plane" is intended to describe a plane coinciding with the axis of rotation. The term "leading cutting edge" denotes the initial portion of a cutting edge, which the first part of the cutting edge to cut into the material when a cutting process is being performed. Similarly, the term "trailing cutting edge" denotes the end portion of a cutting edge. The material to be cut is fed past the cutting tool in a direction at right angles to the axis of rotation of the cutting tool.

According to a preferred embodiment, the invention relates to a cutting tool arranged to be mounted on a shaft for rotation about an axis. The cutting tool comprises a body having a radial extension delimited by a pair of side surfaces, an axial width delimited by a peripheral surface, and a number of seats for attaching exchangeable cutting inserts. The peripheral surface is arranged along a varying radius and will, for instance, slope away with a reduction of its radius behind at least each main cutting insert. In addition, a chip pocket is provided in front of each main cutting insert to allow cut material to be removed. The peripheral main cutting inserts perform a major portion of the material removal and will be referred to as "first cutting inserts" in the subsequent text. The cutting tool comprises at least two first cutting inserts mounted with equal spacing at the outer periphery of the body, which first cutting inserts have a cutting edge extending at least across the width of the body at a predetermined peripheral radius from the axis. The cutting tool is further provided with a number of side cutting inserts. The side cutting inserts perform a relatively minor portion of the material removal and will be referred to as "second cutting inserts" in the subsequent text. The cutting tool comprises at least two second cutting inserts mounted with equal spacing adjacent the outer periphery on a first side surface of the body, which second cutting inserts have a cutting edge extending in an axial plane at right angles to the axis. During a cutting operation, at least one second cutting insert will precede each first cutting insert.

According to the invention, the cutting edge of each first cutting insert is arranged to extend up to, but not into the axial plane of the radially outer portion of the cutting edges of the second cutting inserts. Preferably, the cutting edge of each first cutting insert is arranged to be terminated a predetermined distance from this axial plane, as described in further detail below. The cutting edge of each second cutting insert preceding a first cutting insert is arranged to extend a predetermined radial distance outside the peripheral radius of the radially outer portion of the cutting edges of the first cutting inserts.

The peripheral first cutting inserts are arranged to have a greater depth of cut than the second cutting inserts, as they perform most of the material removal. The material removal performed by the first cutting inserts is in the form of wood chips that are formed in the cutting process. Chip quality, consistency of size within certain parameters, is determined by, for instance, rate of feed of the timber product and the cutting geometry of the cutting tool. The second cutting inserts are arranged to perform a shaving or finishing cut to provide a smooth finish on a side surface at right angles to the cut made by a preceding first cutting insert. Virtual extensions of the cutting edges of the angularly spaced first and second cutting inserts are arranged to intersect at the point of entry of the respective cutting edges into the material to be cut in order to form a corner. The second cutting inserts are arranged to extend up to 0.3 mm, preferably in the range 0.1-0.2 mm, outside the leading cutting edge of a subsequent first cutting insert in the axial direction of the cutting tool.

The second cutting inserts also extend a predetermined distance radially outside the outermost radius of an immediately subsequent first cutting insert. The scoring operation is performed to facilitate the cutting operation for a subsequent first cutting insert, in order to weaken the material adjacent the leading cutting edge of the first cutting insert. When performing the scoring operation, a radially outer portion of the cutting edge of each second cutting insert is arranged to extend a distance of up to 2 mm, preferably in the range 1-2 mm, outside the peripheral radius of the cutting edge of a subsequent first cutting insert. In this way, the at least one second insert preceding a first cutting insert will perform a combined shaving and scoring operation.

The effect of this arrangement is that a shallow score is cut radially into the material to be removed by a subsequent first cutting insert in the plane of the finished side surface cut by the second cutting insert. As the subsequent first cutting insert reaches its point of entry into the material and begins to cut, the scoring cut made by the preceding second cutting insert encourages the material to shear off without causing chipping or flaking into the axial plane of the side surface cut into the material. The side surface is then finished by subsequent one or more second cutting inserts. Compared to a conventional pre-cut slot provided by a circular saw blade, this scoring or pre-cutting operation will result in a more even and smooth side surface for the profiled cut made into the material. The scoring operation will also result in less waste, as a conventional pre-cut slot can require the use of a saw blade having a predetermined thickness.

According to a preferred example, the cutting edges of the at least two first cutting inserts are arranged at an angle relative to a radial plane through the leading cutting edge of a first cutting insert, wherein the leading cutting edge is adjacent the first side surface. The cutting edges of the first cutting inserts are arranged at an angle in the range 20-30°, preferably at an angle of 25° relative to a radial plane through the axis of rotation.

The effect of the arrangement using angled cutting edges and inserts is that the cutting action of the first cutting insert will begin gradually, as the leading cutting edge of the insert reaches its point of entry into the material first. As the cutting tool is rotated the full extension of the cutting edge will come into contact with the material and begin to cut. This arrangement will reduce the force variations induced into the cutting tool as each consecutive first insert begins to cut into the material. A reduction of the force variations and a smoother cutting action also reduces the power requirement for driving the cutting tool. The gradual cutting action will result in a reduction in loading and wear on the cutting inserts, which will extend the useful life of the tool. The angled cutting edges of the first cutting inserts will also cause a transverse force on the cutting tool, biasing the cutting tool in the direction of the axial side surface being cut through the material. This transverse force can assist in counteracting any sudden axial displacements of the cutting tool caused by regions of greater density in the material to be cut, for instance knots in a timber product.

According to an alternative example, the cutting edges of the at least two first cutting inserts can be arranged in a radial plane at right angles to the direction of cut. However, this arrangement less desirable, as it will not provide the advantages outlined above relating to force distribution, power requirements and tool life.

The cutting edge of a first cutting insert can be straight, in which case the leading and trailing cutting edges of the insert will be located at a radius marginally outside a central portion of the cutting edge. The difference in radii will depend on the selected angle of the cutting edge and/or the width of the body of the cutting tool. A cross-section in a radial plane through a cut section of material will show that the peripheral surface of the cut section is slightly convex following a cutting operation. However, as this peripheral surface will usually be machined in a subsequent processing step the shape of the resulting section has no relevance for the invention. The advantage of using a straight cutting edge is that the full width of the insert can be used if the main insert is mounted for use as a side cutting insert.

Alternatively, the cutting edge of a first cutting insert can be curved to conform to the diameter of the cutting tool and the selected angle of the cutting edge. In this case the leading, central and trailing cutting edge portions of the first cutting insert will be located at a constant radius from the central axis of the cutting tool. In this case, a cross-section through a radial plane through a cut section of material will show that the peripheral surface of the cut section is straight following a cutting operation. As indicated above, as this surface will usually be machined in a subsequent processing step this result has no relevance for the invention. An advantage of using a curved cutting edge is that the cutting edge of the insert will begin to cut gradually into the side surface to provide a smoother cutting operation if the main insert is mounted for use as a side cutting insert. The reason for this is that the trailing cutting edge of a second cutting insert forms the radially outer portion of the second cutting insert.

Consequently, the choice of using straight or curved cutting edges for the first inserts can be made by the operator, as it has no impact on the effect to be achieved by the invention.

According to a preferred example, the cutting edges of the least two second cutting inserts are arranged at a negative angle relative to a radial plane through the trailing cutting edge. Consequently, the tip of the trailing cutting edge adjacent the outer periphery of the cutting tool intersects the radial plane and the radially inner, leading cutting edge is located in front or the radial plane in the direction of rotation of the cutting tool. The cutting edges of the second cutting inserts can be arranged at a negative angle of up to 35° relative to a radial plane through the axis of rotation. During a cutting operation, when the cutting tool has reached its full cutting depth into the material, the radially outer trailing cutting edge of each second cutting insert will perform a scoring operation. Simultaneously, the remaining second cutting edge performs a shaving or finishing cut to provide a smooth finish on the side surface.

The effect of the arrangement using second inserts mounted with their cutting edges at a negative angle is that the cutting action of the second cutting insert will begin gradually, as the radially inner leading cutting edge of the insert reaches its point of entry into the material first. Also, the negative angle assists in transporting and removing cut material towards to outer periphery of the cutting tool.

Alternatively, the cutting edges of the second cutting inserts of the cutting tool can be arranged so that the cutting edges of the at least two second cutting inserts are arranged in a radial plane. However, this arrangement less desirable, as it will be less effective in providing the advantages outlined above relating to a smoother cutting operation and material removal.

In order to attach the cutting inserts to the cutting tool each of the first and second inserts comprise at least one threaded bore for attaching the insert to the body. The first and second inserts can then be fixedly attached to the body of the cutting tool by at least one threaded fastener passing through a portion of the body and into a correspondingly threaded bore in the rear portion of the insert. By using a suitable fastener, such as an Allen screw or similar, the inserts can be attached with no or few component parts or attachment means protruding out of the insert or the outer periphery of the body of the cutting tool.

Advantages of this arrangement are that the cutting tool can be given a compact design with no parts of the attachment means arranged outside the outer periphery of the inserts or the body. By concealing the attachment means within the outer delimiting surfaces of the body and the inserts there will be fewer cavities or corners where cut material can aggregate and interfere with the cutting operation. Also, the threaded bores in the inserts allow them to be mounted without separate clamps or tool holders and without requiring adjustments or setting the cutting tool up in a fixture.

As indicated above, the first and second inserts can be identical and interchangeable. The advantage of this is that only one type of insert need be provided, which reduces the cost of replacement inserts. The first and second inserts can also be reversible, comprising at least two cutting edges.

The invention further relates to an apparatus for using the cutting tool for longitudinal profiling a timber product, in particular for profiling a log prior to subdividing the log into board or similar products. The apparatus comprises an assembly of at least one pair of cutting tools according to any one of the embodiments described above, which cutting tools are mounted at a predetermined spacing with facing first surfaces. The tools can be mounted on separate axles or on the same axle and are rotatable about the same axis. An identical second assembly is arranged on the opposite side of the timber product to be cut. The axes of the two identical assemblies are located in parallel at a second predetermined spacing. The predetermined first and second spacing can be determined by a 3D-scanner that calculates possible dimensions for subsequent cutting of a current timber product and outputs a desired spacing to the apparatus. Prior to a profiling operation, the apparatus will adjust the spacing between the facing cutting tools to a first predetermined distance. At the same time, the apparatus will adjust the spacing between the axes of the two assemblies to a second predetermined distance.

Depending on the size of the timber product to be processed, the width of the cut required may exceed the width of the cutting tool according to the invention. For timber products exceeding a certain dimension, a wider cut can be achieved by mounting one or more additional cutting tools. In this case, each assembly of cutting tools comprises a set of cutting tools assembled side by side, wherein each additional cutting tool is mounted remote from the respective facing first sides. The additional cutting tools comprise at least two first cutting inserts mounted with equal spacing at the outer periphery of the additional cutting tool. The peripheral main, or first cutting inserts on the respective facing cutting tool and the main cutting inserts on each additional cutting tool are arranged on the same radius from the axis of rotation of the cutting tools. The side, or second cutting inserts are only required on the pair of facing cutting tools. Once the timber product has been profiled using the inventive cutting tool it is passed forward for subsequent cutting and sub-dividing processes.

An advantage of an apparatus according to the invention is that the timber product can be cut to a desired profile directly by the inventive cutting tool immediately after passing through the 3D-scanner that determines its dimensions. In a conventional processing plant, the profile cutting of the timber product would usually be preceded by an intermediate step involving a preparatory cut using rotary saw blades to prevent chipping of the surfaces parallel to the side surfaces of the profile cutting tools. Using a profiling cutting tool according to the invention makes such a preparatory cut unnecessary and achieves a smooth side surface.

FIGURES

In the following text, the invention will be described in detail with reference to the attached drawings. These schematic drawings are used for illustration only and do not in any way limit the scope of the invention. In the drawings.

DETAILED DESCRIPTION

Figure 1:
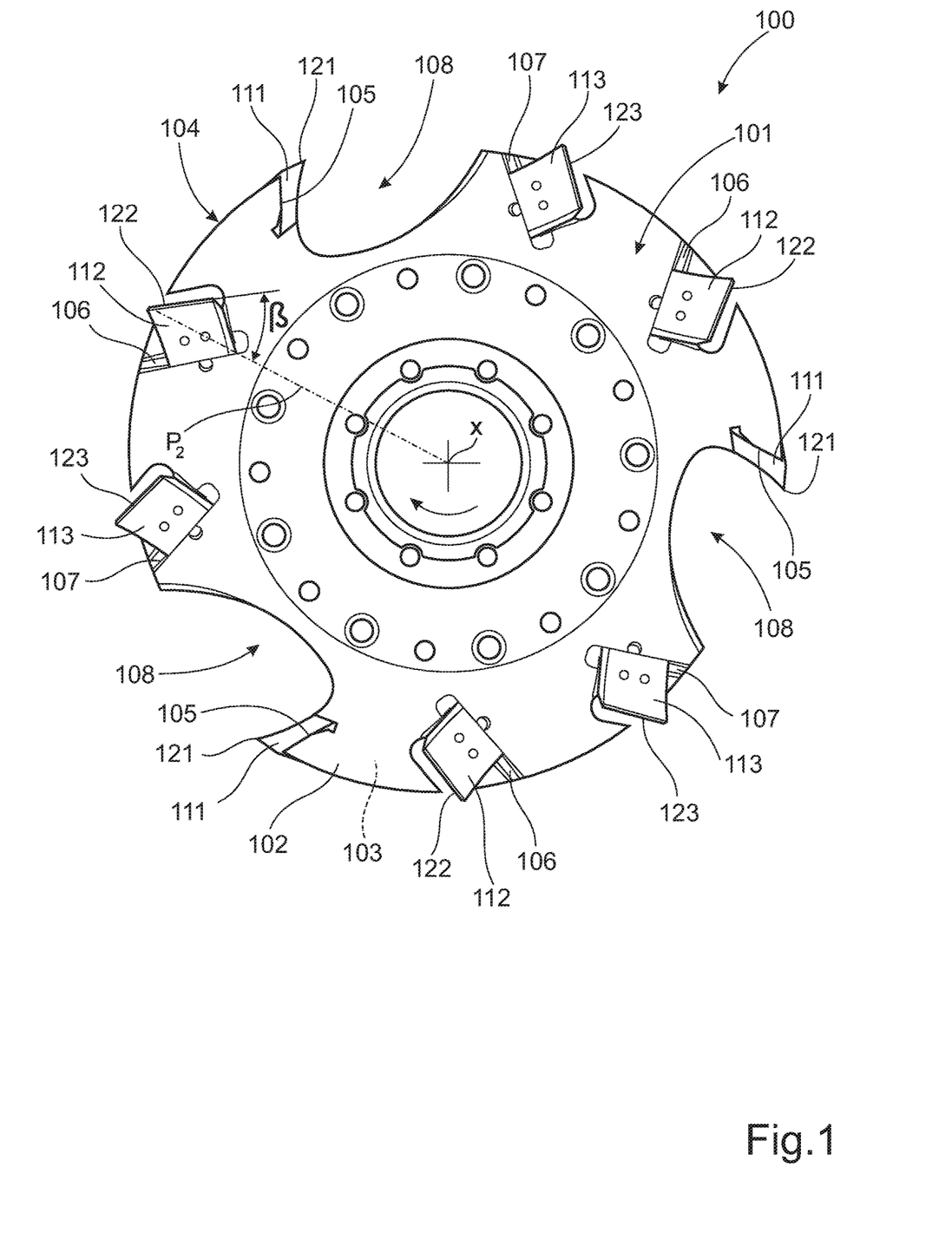
FIG. 1 shows a schematically indicated side view of a cutting tool according to the invention.

FIG. 1 shows a schematically indicated side view of a cutting tool 100 according to the invention. The embodiment in FIG. 1 shows the cutting tool 100 arranged to be mounted on a shaft (see FIG. 9) for rotation about an axis X. The cutting tool 100 comprises a body 101 having a radial extension delimited by a pair of side surfaces 102, 103, an axial width delimited by a peripheral surface 104, and a number of seats 105, 106, 107 for attaching exchangeable cutting inserts 111, 112, 113. The peripheral surface 104 is arranged along a varying radius and slopes away with a reduction of its radius behind each first cutting insert 111. In addition, a chip pocket 108 is provided in front of each first cutting insert 111 to allow cut material to be removed. The cutting tool can comprise at least two first cutting inserts mounted with equal spacing at the outer periphery of the body. In this example, three identical first cutting inserts 105 are arranged with a spacing of 120° at a predetermined peripheral radius from the axis X. The first cutting inserts are main cutting inserts performing a major portion of the material removal. The first cutting inserts 111 have a cutting edge 121 extending at an angle across the width of the body, and a predetermined axial distance outside the side surface on at least one side of the body. The embodiment in FIG. 1 has first cutting inserts 111 with a first end of the cutting edge 121 arranged substantially flush with a first side surface 102 of the body 101 and a second end of the cutting edge 121 extending a predetermined distance past a second side surface 103 of the body 101 (see FIG. 2A).

Figure 2A:
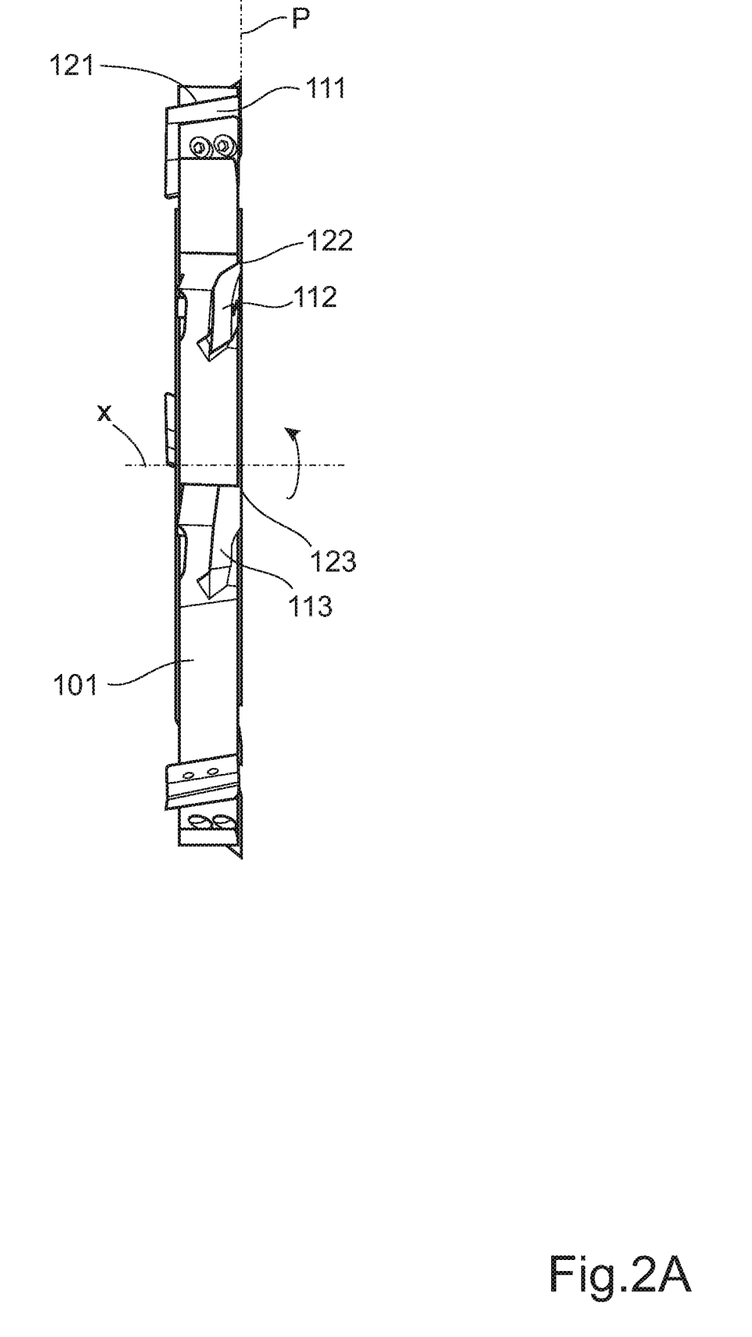
FIG. 2A shows a schematically indicated front view of the cutting tool in FIG. 1.

The cutting tool is further provided with a number of second cutting inserts 112, 113. The cutting tool can comprise at least two second cutting inserts mounted with equal spacing adjacent the outer periphery on the first side surface 102 of the body 101. In this example, six identical second cutting inserts 112, 113 are used, wherein a pair of second cutting inserts 112, 113 is mounted with a predetermined spacing between adjacent first cutting inserts 111. The second cutting inserts 112, 113 are side cutting inserts arranged to perform a relatively minor portion of the material removal. In this example the second cutting inserts 112, 113 have cutting edges 122, 123 extending in an axial plane P at right angles to the axis of rotation X, as indicated in FIG. 2A.

Figure 2B:
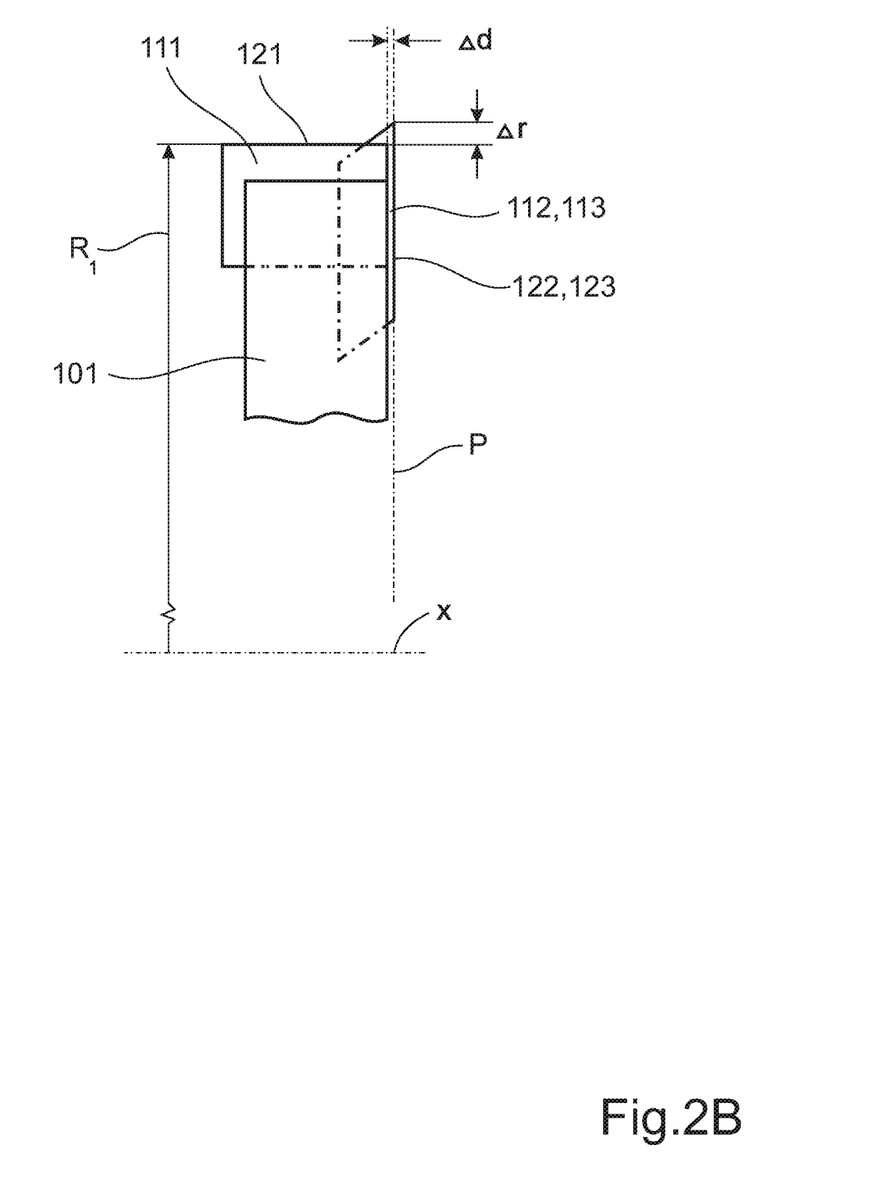
FIG. 2B shows a schematic enlarged view of the cutting tool in FIG. 2A.

According to the invention, the cutting edge 121 of each first cutting insert 111 is arranged to extend up to, but not into the axial plane P of the radially outer portion of the cutting edges 122, 123 of the second cutting inserts 112, 113. Preferably, the cutting edge 121 of each first cutting insert 111 is arranged to be terminated a predetermined distance Δd from this axial plane, as shown in FIG. 2B and described in connection with the description of FIG. 3 below. In addition, the cutting edge 122, 123 of each second cutting insert 112, 113 preceding a first cutting insert 111 is arranged to extend a predetermined radial distance Δr (see FIG. 2B) outside the peripheral radius R1 of the cutting edges 121 of the first cutting inserts 111.

In operation, the peripheral first cutting inserts 111 are arranged to have a greater depth of cut than the second cutting inserts 112, 113, as they perform most of the material removal. The second cutting inserts 112, 113 are arranged to perform a shaving or finishing cut to provide a smooth finish on a side surface at right angles to the cut made by a preceding first cutting insert. The second cutting inserts can extend an axial distance Δd up to 0.3 mm, preferably in the range 0.1-0.2 mm, outside the leading cutting edge of a subsequent first cutting insert in the axial direction of the cutting tool. In the example shown in FIG. 2B the cutting edges 122, 123 of the second cutting inserts 112, 113 extend 0.2 mm axially outside the leading cutting edge 121 of the respective subsequent first cutting insert 111.

The second cutting inserts 112, 113 also extend a predetermined distance Δr radially outside the outermost radius of an immediately subsequent first cutting insert. In this way, the second inserts 112, 113 preceding a first cutting insert 111 will perform a scoring operation. The scoring operation is performed to facilitate the cutting operation for a subsequent first cutting insert, in order to provide a weakened portion in the material adjacent the tip of the leading cutting edge of the first cutting insert. The cutting edges of the second cutting inserts 112, 113 can be arranged to extend a distance of up to 2 mm, preferably in the range 1-2 mm, outside the peripheral radius of the cutting edge of a subsequent first cutting insert 111. In the example shown in FIG. 2B the leading cutting edges of the second cutting inserts 112, 113 extend 1 mm radially outside the cutting edge 121 of the respective subsequent first cutting insert 111.

During a cutting operation, each pair of second cutting inserts 112, 113 will precede each first cutting insert 111 to perform a scoring operation in the radial direction of the cutting tool 100. The subsequent first insert 111 will cause the material to shear along the scored area and prevent chipping or flaking in the side surface of the profiled cut section. Subsequently, each pair of second cutting inserts 122, 123 following a preceding first cutting insert 111 will perform a shaving operation on a side surface made by a preceding first cutting insert at right angles to the axis of rotation of the cutting tool, while at the same time performing a scoring operation for the next first cutting insert.

Figure 3:
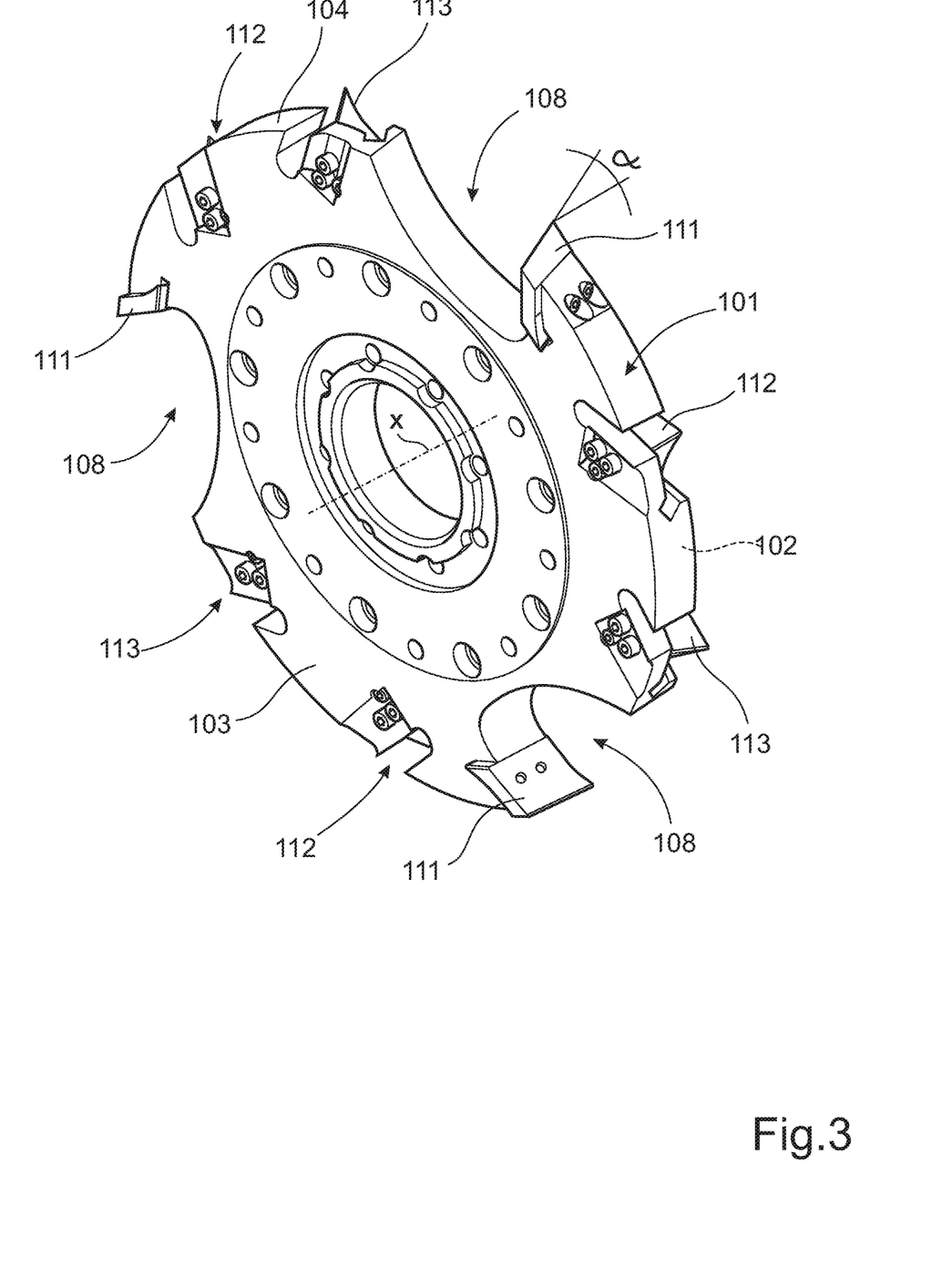
FIG. 3 shows a perspective view of the cutting tool in FIG. 1.

FIG. 3 shows a perspective view of the cutting tool in FIG. 1. According to this example, the cutting edges 121 of the first cutting inserts 111 are arranged at an angle α relative to a radial plane through the leading cutting edge of a first cutting insert, wherein the leading cutting edge is adjacent the first side surface. The cutting edges of the first cutting inserts can be arranged at an angle in the range 20-30°, preferably at an angle of 25° relative to a radial plane through the axis. In the example shown in FIG. 3 the cutting edges 121 of the first cutting inserts 111 are arranged at an angle of 25°. It should be noted that when selecting this angle α, the front cutting edge angle of the cutting edge relative to the basic shape of the insert body must be taken into account. The selected angle α for the cutting edge is the sum of this front cutting edge angle and the angle of the insert body relative to the body of the cutting tool.

The cutting edges 121 of the first cutting inserts 111 in this example are straight, in which case the leading and trailing cutting edges of the insert will be located at a radius marginally outside a central portion of the cutting edge. The difference in radii will depend on the angle α of the cutting edge and/or the width of the body 101 of the cutting tool 100. A cross-section through a radial plane through a cut section of material would show that the cut peripheral section is slightly convex following a cutting operation. However, as this surface will be machined in a subsequent processing step this result has no relevance for the invention. The advantage of using a straight cutting edge is that the full width of the insert can be used when the insert is mounted for use as a side cutting insert.

Alternatively, the cutting edge of a first cutting insert can be curved (not shown), in which case the leading, central and trailing cutting edges of the insert can be located at a constant radius from the central axis of the cutting tool. Such a curved cutting edge would be less advantageous if the insert is mounted as a side cutting insert, as indicated above.

Further, the cutting edges 122, 123 of the second cutting inserts 112, 113 are arranged at a negative angle β relative to a radial plane through the trailing cutting edge. FIG. 1 indicates how the trailing end of a cutting edge 122 adjacent the outer periphery intersects a radial plane P2, wherein the radially inner leading end of the cutting edge 122 is located in front of the radial plane P2 in the direction of rotation of the cutting tool. The cutting edges of the second cutting inserts can be arranged at an angle β of up to 35° relative to the radial plane P2 through the axis X. In the example shown in FIG. 1, the cutting edges of the second cutting inserts are arranged at a negative angle of 35°. During a cutting operation, when the cutting tool has reached its full cutting depth into the material, the radially outer trailing cutting edge of each second cutting insert 112, 113 will perform a scoring operation.

Figure 4A:
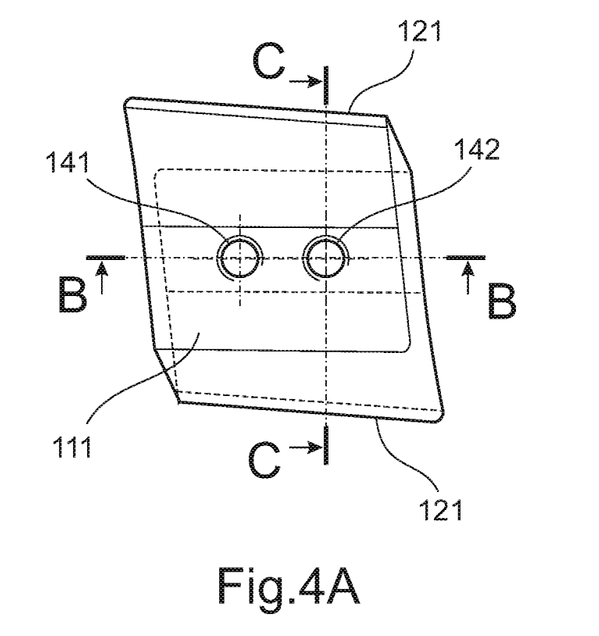
FIGS. 4A-D show a number of views of a schematically indicated cutting insert suitable for a cutting tool according to the invention.

FIGS. 4A-4D show a number of views of a schematically indicated cutting insert suitable for a cutting tool according to the invention. FIG. 4A shows a plan view of a cutting insert 111 according to the invention. Although the numbering for a first cutting insert is used, the first and second inserts 111, 112, 113 can be identical and interchangeable. The advantage of this is that only one type of insert need be provided for use a both main and side cutting inserts. The cutting insert 111 is also reversible and has two identical cutting edges 121. Suitable dimensions for rake angle, clearance angle, wedge angle, etc. will not be discussed in detail here, as the selection of a suitable insert for this purpose can be made by a person skilled in the art. The cutting insert is attachable to the cutting tool by means of two threaded bores 141, 142 extending through the body of the cutting insert 111.

Figure 4B:
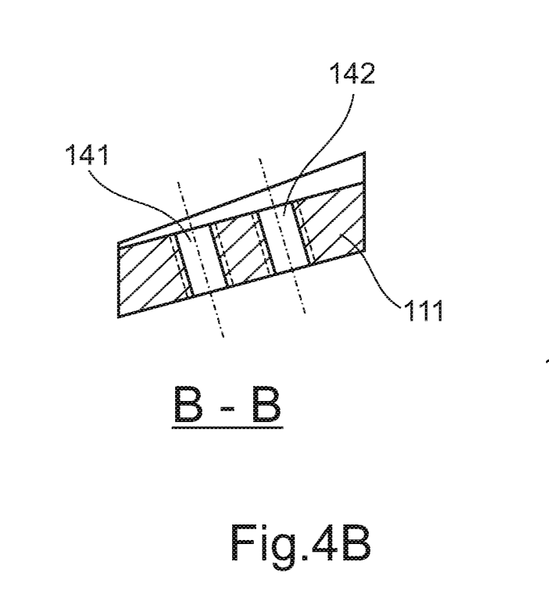
Figure 4C:
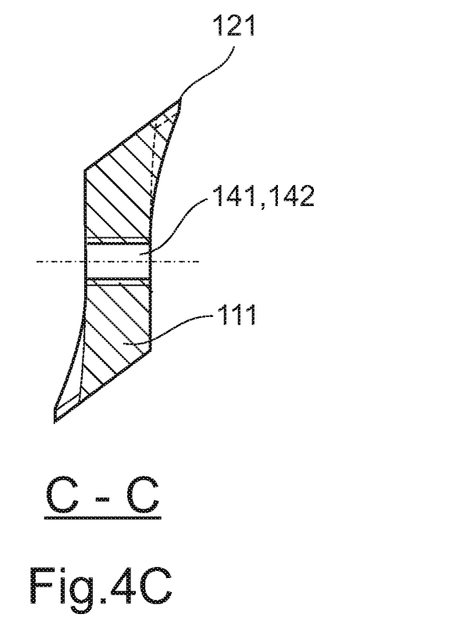
Figure 4D:
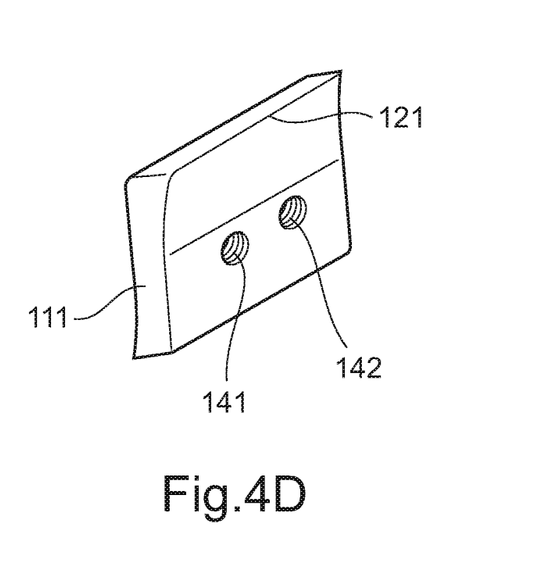

FIG. 4B shows a cross-section B-B through the cutting insert in FIG. 4A, indicating the relative positions of the parallel threaded bores 141, 142. FIG. 4C shows a similar cross-section C-C, taken at right angles to the cross-section B-B through on of the threaded bores 142. FIG. 4D shows a schematic perspective view of the cutting insert 111.

Figure 5A:
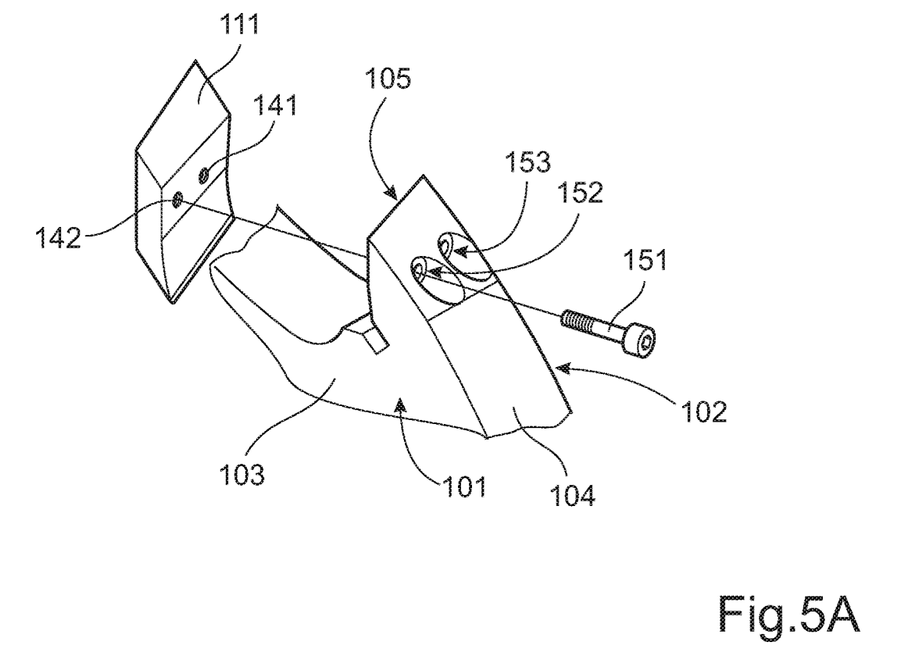
FIGS. 5A-B show schematically indicated exploded views of the mounting of inserts in the cutting tool in FIG. 1.
Figure 5B:
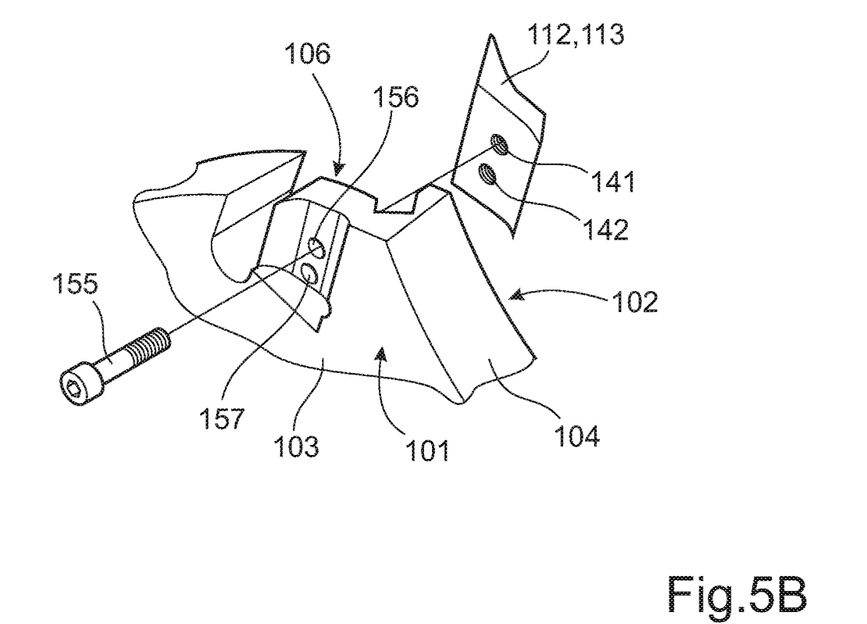

FIGS. 5A-B show schematically indicated exploded views of the mounting of the first and second inserts in the cutting tool in FIG. 1. In order to attach cutting inserts to the cutting tool 101 each of the first and second inserts 111, 112, 113 each comprise two threaded bores 141, 142 for attaching the respective cutting insert 111 to the body 101.

FIG. 5A shows a first cutting insert 111 to be positioned and fixed in a seat 105 in the body 101. The first insert 111 can be fixedly attached to the body 101 of the cutting tool by a pair of threaded fasteners 151 (one shown) passing apertures 152, 153 passing through a portion of the body 101 and into the threaded bores 141, 142 in a rear portion of the first cutting insert 111. The apertures 152, 153 extend from the peripheral surface 104 of the body 101 and through to the seat 105. By using a suitable fastener, such as an Allen screw or similar, the first cutting insert is attached with no portion of the attachment means protruding out of the cutting insert or the peripheral surface of the body of the cutting tool.

FIG. 5B shows a second cutting insert 112, 113 to be positioned and fixed in a seat 106 in the body 101. The second cutting insert 112, 113 can be fixedly attached to the body 101 of the cutting tool by a pair of threaded fasteners 155 (one shown) passing apertures 156, 157 passing through a portion of the body 101 and into the threaded bores 141, 142 in a rear portion of the second cutting insert 112, 113. The apertures 156, 157 extend from the second side surface 103 of the body 101 and through to the seat 106. By using a suitable fastener, such as an Allen screw or similar, the second cutting insert is attached with no portion of the attachment means protruding out of the cutting insert or the side surface of the body of the cutting tool.

Advantages of this arrangement are that the cutting tool can be given a compact design with no parts of the attachment means arranged outside the outer periphery of the inserts or the body. By concealing the attachment means within the outer delimiting surfaces of the body and the inserts there will be fewer cavities or corners where cut material can aggregate and interfere with the cutting operation. Also, the threaded bores in the inserts allow them to be mounted without requiring adjustments of the inserts or setting up the cutting tool in a fixture. As indicated above, the first and second inserts can be identical and interchangeable. The advantage of this is that only one type of insert need be provided, which reduces the cost of replacement inserts.

Figure 6:
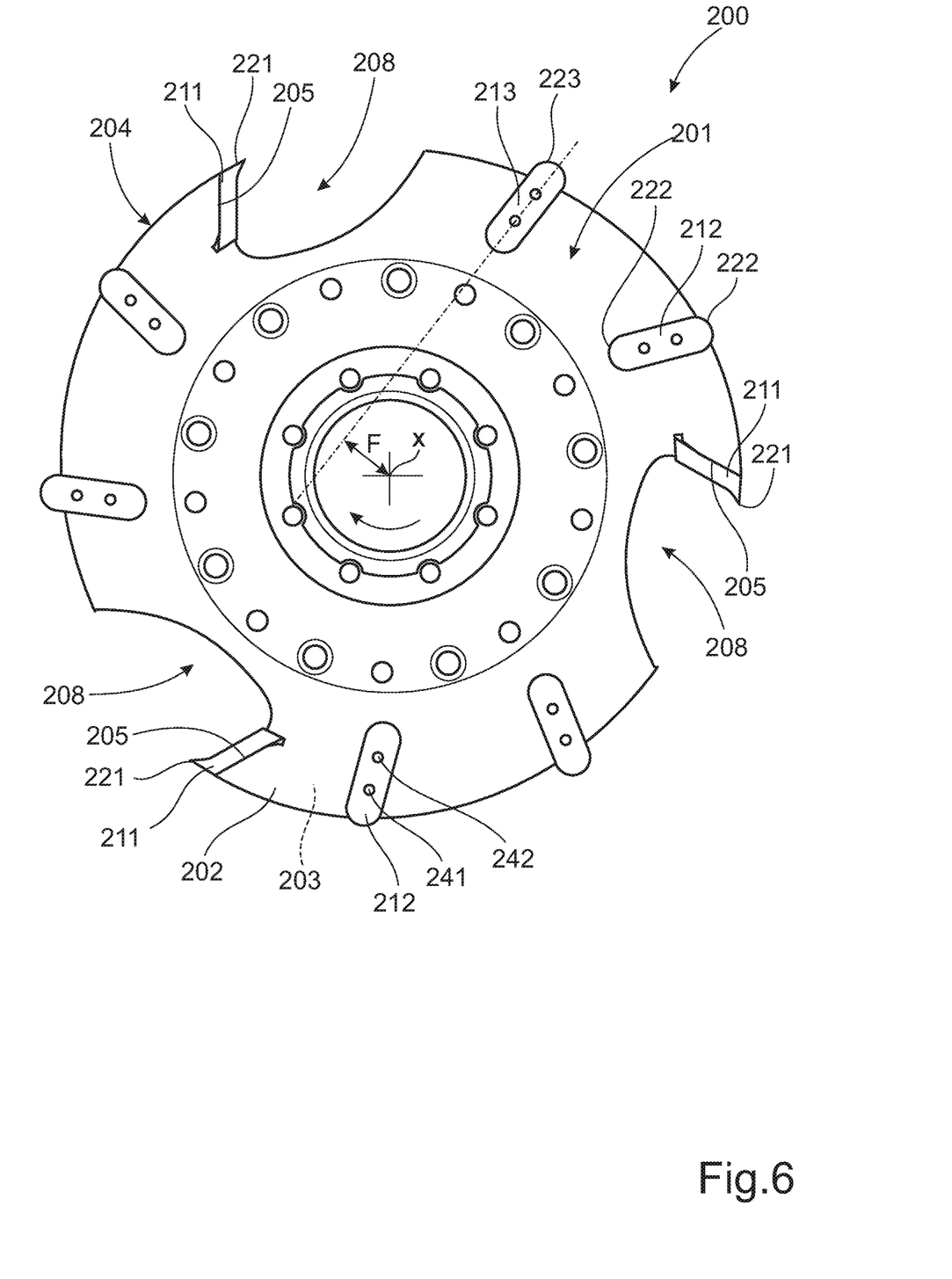
FIG. 6 show a schematically indicated side view of an alternative cutting tool according to the invention.
Figure 7:
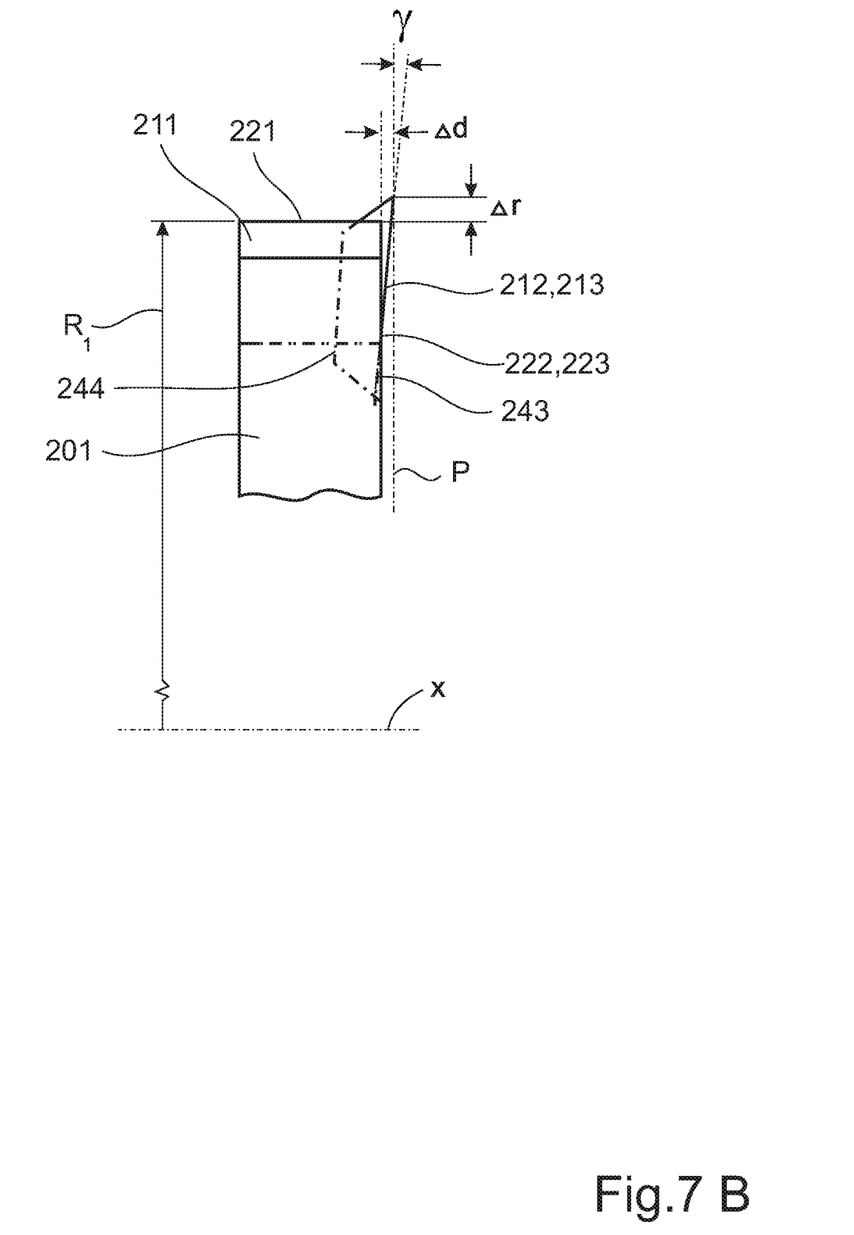
FIG. 7A shows a schematically indicated front view of the cutting tool in FIG. 6.
FIG. 7B shows a schematic enlarged view of the cutting tool in FIG. 7A.
Figure 7A:
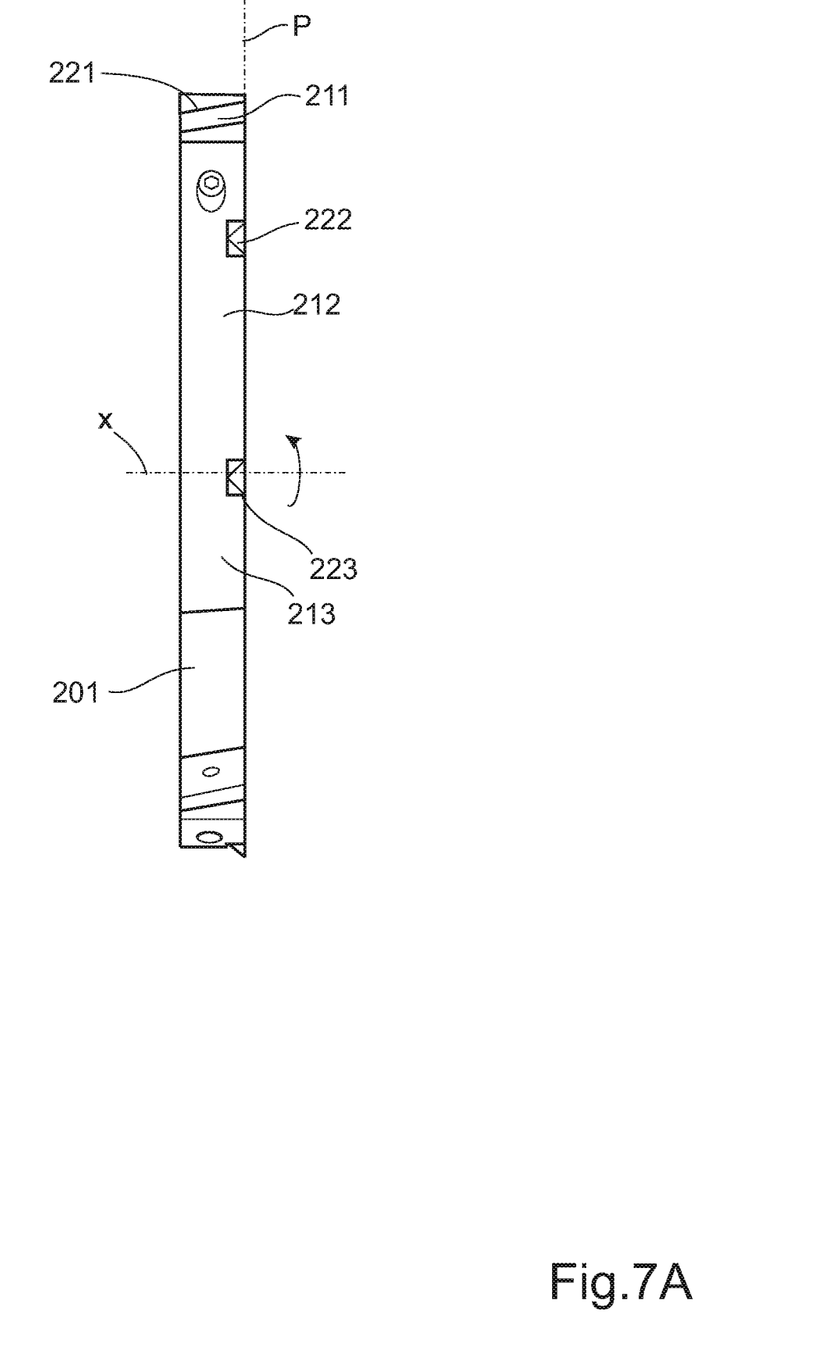

FIG. 6 shows a schematically indicated side view of an alternative cutting tool 200 according to the invention. The embodiment in FIG. 6 shows the cutting tool 200 arranged to be mounted on a shaft (see FIG. 9) for rotation about an axis X. The cutting tool 200 comprises a body 201 having a radial extension delimited by a pair of side surfaces 202, 203, an axial width delimited by a peripheral surface 204, and a number of seats 205, 206, 207 for attaching exchangeable cutting inserts 211, 212, 213. The peripheral surface 204 is arranged along a varying radius and slopes away with a reduction of its radius behind each first cutting insert 211. In addition, a chip pocket 208 is provided in front of each first cutting insert 211 to allow cut material to be removed. The cutting tool can comprise at least two first cutting inserts mounted with equal spacing at the outer periphery of the body. In this example, three identical first cutting inserts 205 are arranged with a spacing of 120° at a predetermined peripheral radius from the axis X. The first cutting inserts are main cutting inserts performing a major portion of the material removal. The first cutting inserts 211 have a cutting edge 221 extending at an angle across the width of the body, and a predetermined axial distance outside the side surface on at least one side of the body. The embodiment in FIG. 6 has first cutting inserts 211 with a first end of the cutting edge 221 arranged substantially flush with a first side surface 202 of the body 201 and a second end of the cutting edge 221 extending a predetermined distance past a second side surface 203 of the body 201. This is illustrated in FIG. 7A, which shows a schematically indicated front view of the cutting tool in FIG. 6.

The cutting tool is further provided with a number of second cutting inserts 212, 213. The cutting tool can comprise at least two second cutting inserts mounted with equal spacing adjacent the outer periphery on the first side surface 202 of the body 201. The second cutting inserts 212, 213 have a longitudinal extension with a cutting edge at each end of the respective insert body. The second cutting inserts can be mounted with their respective longitudinal axis intersecting the axis of rotation of the tool, or with the longitudinal axis offset a predetermined distance F from the axis of rotation of the tool as indicated in FIG. 6. The offset is selected so that the longitudinal axis of the insert is angled into the direction of rotation of the tool, in order to transfer cutting forces to the radially inner surface of the seat as well as the rear surface of the seat. In this example, six identical second cutting inserts 212, 213 are used, wherein a pair of second cutting inserts 212, 213 is mounted with a predetermined spacing between adjacent first cutting inserts 211. The second cutting inserts 212, 213 are side cutting inserts arranged to perform a relatively minor portion of the material removal. In this example, the second cutting inserts 212, 213 have cutting edges 222, 223 along a radially outer portion of an outer surface 243 facing the workpiece. The plane of the outer surface 243 extends out of the body 201 towards a radial plane P (se FIG. 7A) at an angle γ to a radial plane through the axis of rotation X, as indicated in FIG. 7B. This angle γ can be selected up to 5°, preferably within the range 1-3°.

According to the invention, the cutting edge 221 of each first cutting insert 211 is arranged to extend up to, but not into the axial plane P of the radially outer portion of the cutting edges 222, 223 of the second cutting inserts 212, 213. Preferably, the cutting edge 221 of each first cutting insert 211 is arranged to be terminated a predetermined distance Δd from this axial plane, as shown in FIG. 7B and described in connection with the description of FIG. 3 above. In addition, the cutting edge 222, 223 of each second cutting insert 212, 213 preceding a first cutting insert 211 is arranged to extend a predetermined radial distance Δr (see FIG. 7B) outside the peripheral radius $R_1$ of the cutting edges 221 of the first cutting inserts 211. FIG. 7B shows a schematic enlarged view of the cutting tool in FIG. 7A.

In operation, the peripheral first cutting inserts 211 are arranged to have a greater depth of cut than the second cutting inserts 212, 213, as they perform most of the material removal. The second cutting inserts 212, 213 are arranged to perform a shaving or finishing cut to provide a smooth finish on a side surface at right angles to the cut made by a preceding first cutting insert. The second cutting inserts extend an axial distance Δd up to 0.3 mm, preferably in the range 0.1-0.2 mm, outside the leading cutting edge of a subsequent first cutting insert in the axial direction of the cutting tool. In the example shown in FIG. 7B the cutting edges 222, 223 of the second cutting inserts 212, 213 extend 0.2 mm axially outside the leading cutting edge 221 of the respective subsequent first cutting insert 211.

The second cutting inserts 212, 213 also extend a predetermined distance Δr radially outside the outermost radius of an immediately subsequent first cutting insert. In this way, the second inserts 212, 213 preceding a first cutting insert 211 will perform a scoring operation. The scoring operation is performed to facilitate the cutting operation for a subsequent first cutting insert, in order to provide a weakened portion in the material adjacent the tip of the leading cutting edge of the first cutting insert. The cutting edges of the second cutting inserts 212, 213 can be arranged to extend a distance of up to 2 mm, preferably in the range 1-2 mm, outside the peripheral radius of the cutting edge of a subsequent first cutting insert 211. In the example shown in FIG. 7B the leading cutting edges of the second cutting inserts 212, 213 extend 2 mm radially outside the cutting edge 221 of the respective subsequent first cutting insert 211.

During a cutting operation, each pair of second cutting inserts 212, 213 will precede each first cutting insert 211 to perform a scoring operation in the radial direction of the cutting tool 200. The subsequent first insert 211 will cause the material to shear along the scored area and prevent chipping or flaking in the side surface of the profiled cut section. Subsequently, each pair of second cutting inserts 222, 223 following a preceding first cutting insert 211 will perform a shaving operation on a side surface made by a preceding first cutting insert at right angles to the axis of rotation of the cutting tool, while at the same time performing a scoring operation for the next first cutting insert.

Figure 8A:
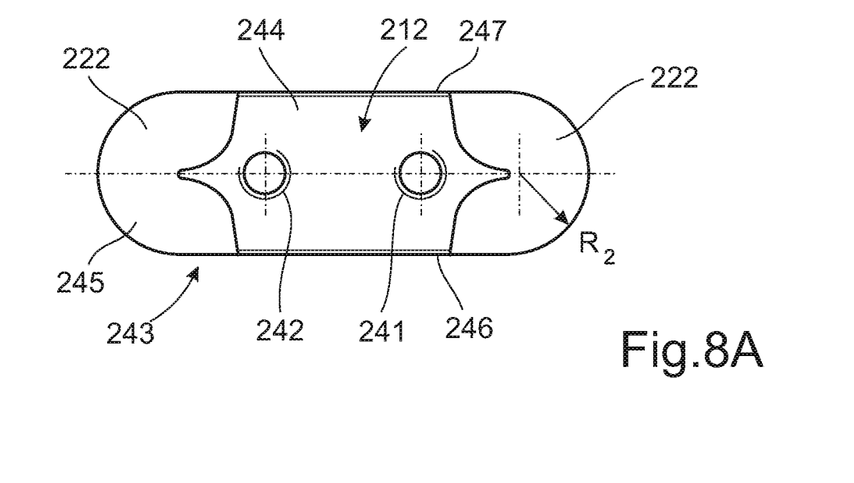
FIGS. 8A-C show a number of views of a schematically indicated alternative cutting insert suitable for a cutting tool according to the invention FIG. 9 show cutter assemblies comprising a cutting tool according to the invention.
Figure 8B:
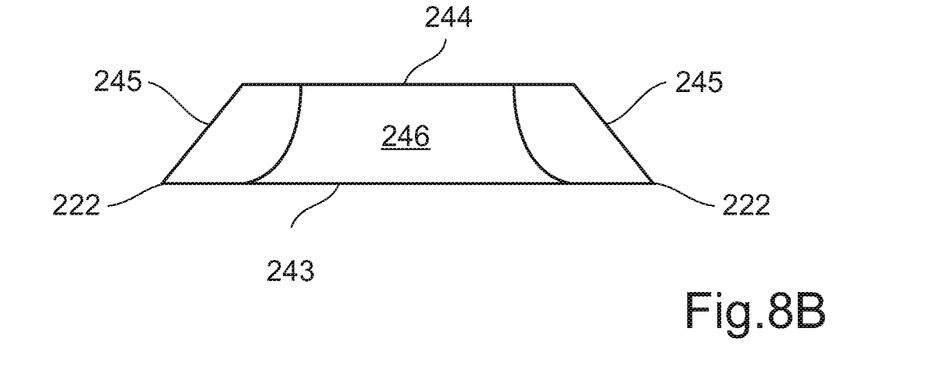
Figure 8C:
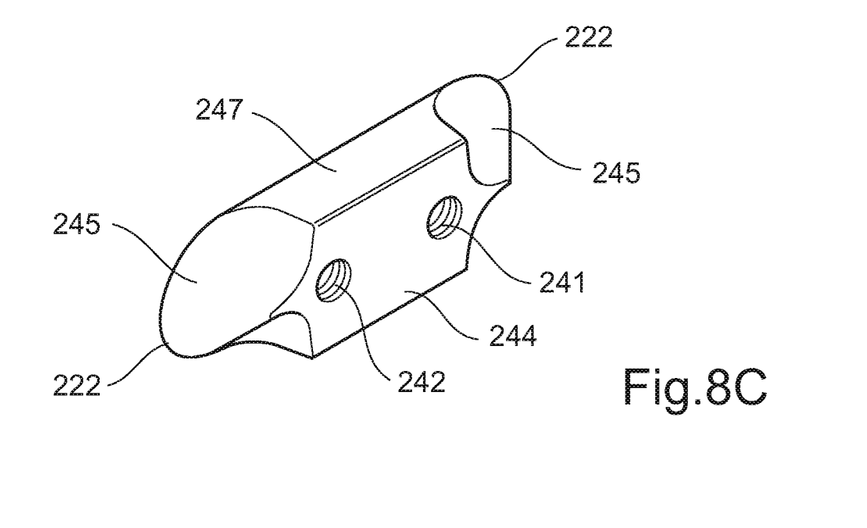

FIGS. 8A-C show a number of views of a schematically indicated alternative cutting insert suitable for a cutting tool according to the invention. FIG. 8A shows a plan view of a second cutting insert 212 according to the invention. The first cutting inserts 211 used are identical to the first inserts and have been described in connection with FIGS. 4A-4D above. The second cutting insert 212 is reversible and has two identical cutting edges 222 at opposite ends of an elongated body. The cutting edge 222 is rounded and has a radius R2 that can be selected between 15 and 30 mm depending on the size and expected loading on the cutting tool. Suitable dimensions for rake angle, clearance angle, wedge angle, etc. will not be discussed in detail here, as the selection of a suitable insert for this purpose can be made by a person skilled in the art. The second cutting insert is attachable to the cutting tool by means of two threaded bores 241, 242 extending through the body of the second cutting insert 212. Fasteners (not shown) cooperating with the threaded bores are inserted from the opposite side of the tool body with respect to the seat for the second insert.

FIG. 8B shows a side view of the cutting insert 212 in FIG. 8A, indicating the relative positions of the parallel threaded bores 241, 242 located on a centerline in the longitudinal direction of the insert. The second insert 212 has an outer surface 243 facing the workpiece, and an inner surface 244 in contact with a seat in the tool body 201 (see FIG. 7B). From each cutting edge 222 at the outer surface, a conical surface 245 (see FIG. 8A) extends away from the cutting edge 222 towards the inner surface 244. The outer and the inner surfaces 243, 244 are further connected by side surfaces 246, 247 arranged at right angles to the outer and the inner surfaces and parallel to the centerline of the insert. FIG. 8C shows a schematic perspective view of the cutting insert 212 in FIG. 8A.

In the above example both cutting edges 222 are located in the plane of the outer surface 243 of the body of the insert. However, one cutting edge can alternatively be located in each of the main inner and outer surfaces.

Figure 9:
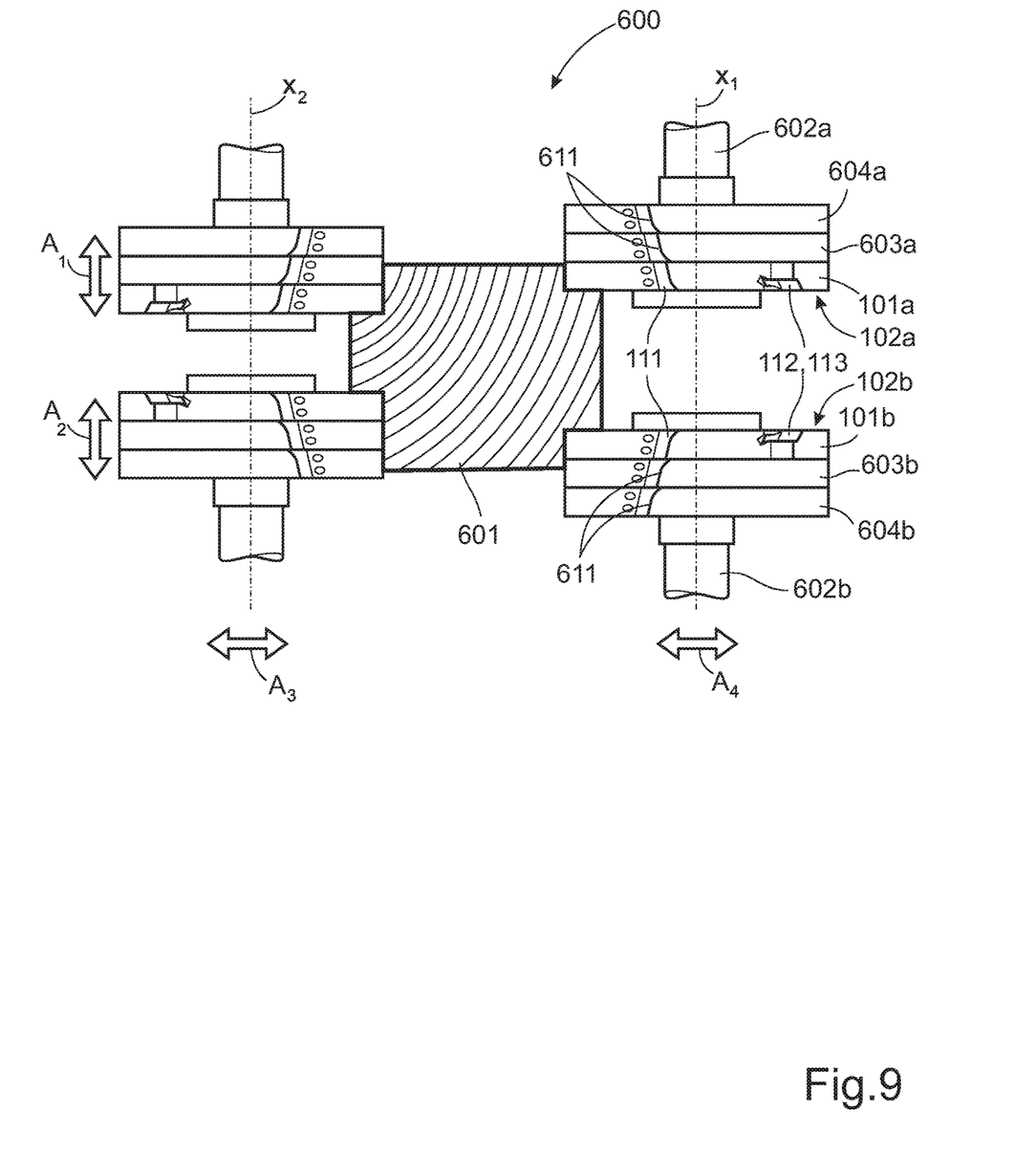

FIG. 9 show schematic cutter assemblies comprising a cutting tool according to the invention. FIG. 9 schematically indicates an apparatus 600 for using cutting tools 100 according to the invention for longitudinal profiling a timber product 601, in particular for profiling a log prior to subdividing the log into board or similar products. The apparatus 600 comprises an assembly of two pairs of cutting tools 101 according to any one of the embodiments described above. A first pair of cutting tools 101a, 101b is mounted at a predetermined spacing with facing first surfaces 102a, 102b. In this example the tools are mounted on separate axles 602a, 602b rotatable about the same axis X1. An identical second assembly is arranged a parallel axis X2 on the opposite side of the timber product 601 to be cut. The axes X1, X2 of the two identical assemblies are located in parallel at a second predetermined spacing. The predetermined first and second spacing can be determined by a 3D-scanner that calculates possible dimensions for a current timber product and outputs a desired spacing to the apparatus. Prior to a cutting operation, the apparatus will adjust the spacing between the facing cutting tools to a first predetermined distance, as indicated by the arrows A1 and A2. At the same time, the apparatus will adjust the spacing between the axes X1, X2 of the two assemblies to a second predetermined distance, as indicated by the arrows A3 and A4.

Depending on the size of the timber product to be processed, the width of the cut required may exceed the width of the cutting tool according to the invention. For timber products exceeding a certain dimension, a wider cut can be achieved by mounting one or more additional cutting tools. In the example shown, each assembly of cutting tools comprises a set of three cutting tools assembled side by side. A first and a second additional cutting tool 603a, 604a and 603b, 604b are mounted to the respective inventive cutting tools 101a, 101b remote from the respective facing first sides. The additional cutting tools 603a, 604a, 603b, 604b comprise first cutting inserts mounted with equal spacing at the outer periphery of the respective additional cutting tool. The peripheral main, or first cutting inserts 111 on the respective facing cutting tool and the identical main cutting inserts 611 on each additional cutting tool 603a, 604a, 603b, 604b are arranged on the same radius from the axis of rotation of the cutting tools. The side, or second cutting inserts 112, 113 are only required on the pair of facing cutting tools 101a, 101b.

Although the above example has described an embodiment comprising three first, or main inserts separated by two second, or side inserts, other combinations are possible within the scope of the invention. When selecting the number of different types of inserts for a cutting tool, it can be required to increase the speed of rotation and/or to vary the number of second cutting inserts relative to the number of first cutting inserts to ensure that the second inserts are in engagement with the material for a sufficient length of time to cut a continuous scored section for a subsequent first cutting insert.

The invention should not be deemed to be limited to the embodiments described above, but rather a number of further variants and modifications are conceivable within the scope of the following patent claims.

The invention claimed is:

1. A wood cutting tool, mountable on a shaft for rotation about an axis for profiling a timber product, the cutting tool comprising:
   a body (101; 201) having a radial extension, an axial width, and seats (105, 106, 107) for attaching cutting inserts (111, 112, 113; 211, 212, 213);
   at least two first cutting inserts (111) mounted with equal spacing at an outer periphery of the body (101; 201), each one of said first cutting inserts (111; 211) having a cutting edge (121; 221) that extends at least across the width of the body (101; 201) at a peripheral radius from the axis; and
   at least two second cutting inserts (112, 113; 212, 213) mounted with equal spacing adjacent the outer periphery on a first side surface of the body (101; 201), said second cutting inserts (112, 113; 212, 213) having cutting edges (122, 123; 222, 223) that extend at least partially into an axial plane (P) at right angles to the axis, wherein the cutting edge (121; 221) of each first cutting insert (111; 211) is arranged to terminate at distance from the axial plane (P) of the second cutting inserts (112, 113; 212, 213), and wherein the cutting edge (122, 123; 222, 223) of each second cutting insert (112, 113; 212, 213) that precedes a first cutting insert (111; 211) is arranged adjacent the leading cutting edge of the first cutting insert and is arranged to extend by a radial distance (Δr) outside the peripheral radius of the cutting edges (121; 221) of the first cutting inserts (111; 211) so as to weaken a material of the timber product adjacent the leading cutting edge of the first cutting inserts.

2. The wood cutting tool according to claim 1, wherein the cutting edges (122, 123; 222, 223) of the second cutting inserts (112, 113; 212, 213) are arranged to extend up to 2 mm outside the peripheral radius of the cutting edge (121; 221) of a subsequent first cutting insert (111; 211).

3. The wood cutting tool according to claim 1, wherein the second cutting inserts (112, 113; 212, 213) are arranged to extend an axial distance (Δd) outside a leading cutting edge of a subsequent first cutting insert (111; 211) in an axial direction of the cutting tool.

4. The wood cutting tool according to claim 3, wherein the second cutting inserts (112, 113; 212, 213) are arranged to extend up to 0.3 mm outside a leading cutting edge of a subsequent first cutting insert (111; 211) in the axial direction of the cutting tool.

5. The wood cutting tool according to claim 1,
wherein the cutting edges (121) of the at least two first cutting inserts (111) are arranged at an angle (α) relative to a radial plane through a leading cutting edge, and
wherein the leading cutting edge is adjacent the first side surface.

6. The wood cutting tool according to claim 5, wherein the cutting edges (121) of the first cutting inserts (111) are arranged at an angle (α) of 20-30° relative to a radial plane through the axis.

7. The wood cutting tool according to claim 1,
wherein the cutting edges of the at least two second cutting inserts (112, 113) are arranged at a negative angle (β) relative to a radial plane through a trailing cutting edge, and
wherein the trailing cutting edge is adjacent the outer periphery.

8. The wood cutting tool according to claim 7, wherein the cutting edges of the second cutting inserts (112, 113) are arranged at a negative angle (β) of up to 35° relative to a radial plane through the axis.

9. The wood cutting tool according to claim 1, wherein the cutting edges of the second cutting inserts (212, 213) are in an outer surface (243) that faces a workpiece, said outer surface (243) extending out of the body (201) towards a radial plane (P) at an angle (γ) to a radial plane through the axis (X).

10. The wood cutting tool according to claim 9, wherein the cutting edges (222, 223) of the second cutting inserts are rounded.

11. The wood cutting tool according to claim 1, wherein each of the first and second inserts comprise at least one threaded bore (141, 142; 241, 242) for attaching the insert to the body (101; 201).

12. The wood cutting tool according to claim 1, wherein each of the first and second inserts are fixedly attached by a threaded fastener (151, 155) passing through a portion of the body (101; 201) and into the insert.

13. The wood cutting tool according to claim 1, wherein the first and second inserts (111, 112, 113) are identical.

14. An apparatus for profiling an elongated timber product, wherein the apparatus comprises an assembly (101a, 603a, 604a; 101b, 603b, 604b) of at least one pair of cutting tools (101a, 101b) according to claim 1, wherein the cutting tools are mounted so as to be spaced from facing first surfaces comprising second cutting inserts (112, 113; 212, 213), and are rotatable about a same axis (X1).

15. The apparatus according to claim 14,
wherein each assembly of cutting tools comprises a set of cutting tools assembled side by side, and
wherein each additional cutting tool (603a, 604a; 603b, 604b) is mounted remote from the respective facing first sides and comprises at least two first cutting inserts (111) mounted with equal spacing at the outer periphery of the additional cutting tools.

16. The wood cutting tool according to claim 2, wherein the second cutting inserts (112, 113; 212, 213) are arranged to extend an axial distance (Δd) outside a leading cutting edge of a subsequent first cutting insert (111; 211) in an axial direction of the cutting tool.

17. The wood cutting tool according to claim 2,
wherein the cutting edges (121) of the at least two first cutting inserts (111) are arranged at an angle (α) relative to a radial plane through a leading cutting edge, and
wherein the leading cutting edge is adjacent the first side surface.

18. The wood cutting tool according to claim 3,
wherein the cutting edges (121) of the at least two first cutting inserts (111) are arranged at an angle (α) relative to a radial plane through a leading cutting edge, and
wherein the leading cutting edge is adjacent the first side surface.

19. The wood cutting tool according to claim 4,
wherein the cutting edges (121) of the at least two first cutting inserts (111) are arranged at an angle (α) relative to a radial plane through a leading cutting edge, and
wherein the leading cutting edge is adjacent the first side surface.

20. The wood cutting tool according to claim 2,
wherein the cutting edges of the at least two second cutting inserts (112, 113) are arranged at a negative angle (β) relative to a radial plane through a trailing cutting edge, and
wherein the trailing cutting edge is adjacent the outer periphery.

* * * * *